US008104536B2

(12) United States Patent
Looney et al.

(10) Patent No.: US 8,104,536 B2
(45) Date of Patent: Jan. 31, 2012

(54) KEROGEN EXTRACTION FROM SUBTERRANEAN OIL SHALE RESOURCES

(75) Inventors: Mark Dean Looney, Houston, TX (US); Robert Steven Lestz, Missouri City, TX (US); Kirk Hollis, Los Alamos, NM (US); Craig Taylor, Los Alamos, NM (US); Scott Kinkead, Los Alamos, NM (US); Marcus Wigand, Los Alamos, NM (US)

(73) Assignees: Chevron U.S.A. Inc., San Ramon, CA (US); Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 12/819,790

(22) Filed: Jun. 21, 2010

(65) Prior Publication Data

US 2010/0270038 A1    Oct. 28, 2010

Related U.S. Application Data

(63) Continuation of application No. 12/361,473, filed on Jan. 28, 2009, now Pat. No. 7,789,164, which is a continuation of application No. 11/675,468, filed on Feb. 15, 2007, now Pat. No. 7,500,517.

(60) Provisional application No. 60/774,337, filed on Feb. 16, 2006, provisional application No. 60/846,982, filed on Sep. 25, 2006.

(51) Int. Cl.
*E21B 43/22* (2006.01)
*E21B 43/25* (2006.01)
*E21B 43/263* (2006.01)
*E21B 49/00* (2006.01)

(52) U.S. Cl. ............... 166/250.01; 166/90.1; 166/272.1; 166/263; 166/299; 166/303; 166/305.1; 166/307; 166/308.2

(58) Field of Classification Search ........................ None
See application file for complete search history.

(56) References Cited

U.S. PATENT DOCUMENTS 1,269,747 A   6/1918   Rogers
3,076,762 A   2/1963   Dill
(Continued)

FOREIGN PATENT DOCUMENTS

EA     200600913     10/2008
(Continued)

OTHER PUBLICATIONS

Andrews, "Oil Shale: History, Incentives, and Policy," CRS Report for Congress, Congressional Research Service, Library of Congress, 2006, Document No. FL 33359.

(Continued)

*Primary Examiner* — George Suchfield
(74) *Attorney, Agent, or Firm* — Merchant & Gould

(57) ABSTRACT

The present invention is directed to methods for extracting a kerogen-based product from subsurface (oil) shale formations, wherein such methods rely on fracturing and/or rubblizing portions of said formations so as to enhance their fluid permeability, and wherein such methods further rely on chemically modifying the shale-bound kerogen so as to render it mobile. The present invention is also directed at systems for implementing at least some of the foregoing methods. Additionally, the present invention is also directed to methods of fracturing and/or rubblizing subsurface shale formations and to methods of chemically modifying kerogen in situ so as to render it mobile.

27 Claims, 3 Drawing Sheets

U.S. PATENT DOCUMENTS

| | | | |
|---|---|---|---|
| 3,136,361 A | 6/1964 | Marx | |
| 3,455,383 A | 7/1969 | Prats et al. | |
| 3,474,863 A | 10/1969 | Deans et al. | |
| 3,481,398 A | 12/1969 | Prats | |
| 3,489,672 A | 1/1970 | Schuman et al. | |
| 3,504,747 A | 4/1970 | Vogt et al. | |
| 3,561,532 A | 2/1971 | Fletcher et al. | |
| 4,162,808 A | 7/1979 | Kvapil et al. | |
| 4,374,545 A | 2/1983 | Bullen et al. | |
| 4,408,665 A | 10/1983 | Dougan | |
| 4,703,798 A | 11/1987 | Friedman | |
| 4,718,493 A | 1/1988 | Hill et al. | |
| 4,856,587 A | 8/1989 | Nielson | |
| 4,895,206 A | 1/1990 | Price | |
| 4,913,237 A | 4/1990 | Kutas | |
| 5,091,076 A | 2/1992 | So et al. | |
| 5,394,942 A | 3/1995 | Catania et al. | |
| 5,417,286 A | 5/1995 | Palmer et al. | |
| 5,424,285 A | 6/1995 | Stacy et al. | |
| 5,429,191 A | 7/1995 | Schmidt et al. | |
| 6,918,444 B2 | 7/2005 | Passey | |
| 6,936,159 B1 | 8/2005 | Kean | |
| 6,991,032 B2 | 1/2006 | Berchenko et al. | |
| 7,121,342 B2 | 10/2006 | Vinegar et al. | |
| 7,441,603 B2 | 10/2008 | Kaminsky | |
| 7,500,517 B2 | 3/2009 | Looney et al. | |
| 7,789,164 B2 * | 9/2010 | Looney et al. | 166/402 |
| 7,857,056 B2 | 12/2010 | Kaminsky | |
| 2004/0149433 A1 | 8/2004 | McQueen | |
| 2005/0217851 A1 | 10/2005 | Mansuy | |
| 2007/0261844 A1 | 11/2007 | Cogliandro et al. | |

FOREIGN PATENT DOCUMENTS

RU 2263774 11/2005

OTHER PUBLICATIONS

W.S. Phillips et al., "Induced microearthquake patterns and oil-producing fracture systems in the Austin chalk", Technophysics (Elsevier), vol. 289, pp. 153-169, 1998.

Official Action from Russian Patent Application 2008 137084/03 (047596) issued Apr. 21, 2010.

A. Andrews, "Oil Shale: History, Incentives, and Policy," CRS Report for Congress, Congressional Research Service, Library of Congreww, 2006, Document No. FL 33359.

* cited by examiner

KEROGEN EXTRACTION FROM SUBTERRANEAN OIL SHALE RESOURCES

CROSS-REFERENCE TO RELATED APPLICATIONS

The present Application is a continuation of U.S. patent application Ser. No. 12/361,473 filed Jan. 28, 2009, which is a continuation of U.S. patent application Ser. No. 11/675,468, filed Feb. 15, 2007, now U.S. Pat. No. 7,500,517, which claim priority to U.S. Provisional Application Nos. 60/774.337, filed Feb. 16, 2006 and 60/846,982, filed Sep. 25, 2006. The contents of all of these applications are incorporated herein by reference in their entirety.

FIELD OF THE INVENTION

This invention relates to methods of extracting organic molecules from subterranean shale resources containing an organic kerogen component, particularly wherein such methods involve a step of increasing said kerogen component's accessibility to a fluid.

BACKGROUND

If proponents of Hubbert peak theory are correct, world oil production will soon peak, if it has not done so already. Regardless, world energy consumption continues to rise at a rate that outpaces new oil discoveries. As a result, alternative sources of energy must be developed, as well as new technologies for maximizing the production and efficient consumption of oil. See T. Mast, *Over a Barrel: A Simple Guide to the Oil Shortage*, Greenleaf Book Group, Austin, Tex., 2005.

A particularly attractive alternative source of energy is oil shale, the attractiveness stemming primarily from the fact that oil can be "extracted" from the shale and subsequently refined in a manner much like that of crude oil. Technologies involving the extraction, however, must be further developed before oil shale becomes a commercially-viable source of energy. See J. T. Bartis et al. *Oil Shale Development in the United States: Prospects and Policy Issues*, RAND Corporation, Arlington, Va., 2005.

The largest known deposits of oil shale are found in the Green River Formation, which covers portions of Colorado, Utah, and Wyoming. Estimates on the amount of recoverable oil from the Green River Formation deposits are as high as 1.1 trillion barrels of oil—almost four times the proven oil reserves of Saudi Arabia. At current U.S. consumption levels (~20 million barrels per day), these shale deposits could sustain the U.S. for another 140 years (Bartis et al.). At the very least, such shale resources could moderate the price of oil and reduce U.S. dependence on foreign oil.

Oil shale typically consists of an inorganic component (primarily carbonaceous material, i.e., a carbonate) and an organic component (kerogen). Thermal treatment can be employed to break (i.e., "crack") the kerogen into smaller hydrocarbon chains or fragments, which are gas or liquids under retort conditions, and facilitate separation from the inorganic material. This thermal treatment of the kerogen is also known as "thermal upgrading" or "retorting," and can be done at either the surface or in situ, where in the latter case, the fluids so formed are subsequently transported to the surface.

In some applications of surface retorting, the oil shale is first mined or excavated, and once at the surface, the oil shale is crushed and then heated (retorted) to complete the process of transforming the oil shale to a crude oil—sometimes referred to as "shale oil." See, e.g., Shuman et al., U.S. Pat. No. 3,489,672. The crude oil is then shipped off to a refinery where it typically requires additional processing steps (beyond that of traditional crude oil) prior to making finished products such as gasoline, lubricant, etc. Note that various chemical upgrading treatments can also be performed on the shale prior to the retorting. See, e.g., So et al., U.S. patent application Ser. No. 5,091,076.

A method for in situ retorting of carbonaceous deposits such as oil shale has been described in Kvapil et al., U.S. patent application Ser. No. 4,162,808. In this method, shale is retorted in a series of rubblized in situ retorts using combustion (in air) of carbonaceous material as a source of heat.

The Shell Oil Company has been developing new methods that use electrical heating for the in situ upgrading of subsurface hydrocarbons, primarily in subsurface formations located approximately 200 miles (320 km) west of Denver, Colo. See, e.g., Vinegar et al., U.S. Pat. No. 7,121,342; and Berchenko et al., U.S. Pat. No. 6,991,032. In such methods, a heating element is lowered into a well and allowed to heat the kerogen over a period of approximately four years, slowly converting (upgrading) it into oils and gases, which are then pumped to the surface. To obtain even heating, 15 to 25 heating holes could be drilled per acre. Additionally, a ground-freezing technology to establish an underground barrier around the perimeter of the extraction zone is also envisioned to prevent groundwater from entering and the retorting products from leaving. While the establishment of "freeze walls" is an accepted practice in civil engineering, its application to oil shale recovery still has unknown environmental impacts. Additionally, the Shell approach is recognized as an energy intensive process and requires a long timeframe to establish production from the oil shale.

In view of the aforementioned limitations of the above methods, simpler and more cost-effective methods of extracting the kerogen from the shale would be extremely useful.

BRIEF DESCRIPTION OF THE INVENTION

The present invention is generally directed to methods of extracting a kerogen-based product from subsurface (oil) shale formations, wherein such methods rely on fracturing and/or rubblizing portions of said formations so as to enhance their fluid permeability (e.g., providing a fluid greater accessibility to the shale-bound kerogen), and wherein such methods further rely on chemically modifying the shale-bound kerogen so as to render it mobile. The present invention is also directed to systems for implementing some such methods. Additionally, to the extent that they are themselves novel, the present invention is also directed to methods of fracturing and/or rubblizing subsurface shale formations and to methods of chemically modifying kerogen in situ so as to render it mobile.

In some embodiments, the present invention is directed to methods for extracting a kerogen-based product from a subsurface shale formation comprising subsurface shale, the methods comprising the steps of: (a) increasing accessibility of kerogen in subsurface shale to a fluid, wherein the subsurface shale comprises an inorganic component in addition to the kerogen; (b) contacting the kerogen in the subsurface shale with an extraction fluid to create a mobile kerogen-based product; and (c) transporting the mobile kerogen-based product out of the subsurface shale formation to yield an extracted kerogen-based product.

In some such above-described method embodiments, the step of increasing accessibility comprises the sub-steps of: (a) drilling a cased injection well into the subsurface shale formation comprising the subsurface shale; (b) pressurizing and subsequently sealing the injection well with a dense phase fluid to provide a pressurized well; and (c) rapidly de-pressurizing the pressurized well to reach a steady state reduced pressure. In some such embodiments, the sub-steps of pressurizing and de-pressurizing are repeated.

In some embodiments, the present invention is directed to methods for fracturing and/or rubblizing subsurface shale formations comprising subsurface oil shale, wherein the subsurface shale comprises kerogen and an inorganic component, and wherein said fracturing and/or rubblizing enhances the fluid permeability of the subsurface shale, the methods comprising the steps of: (a) drilling a cased injection well into the subsurface shale formation comprising the subsurface shale; (b) delivering a slurry to the injection well, the slurry comprising liquid $CO_2$ and solid $CO_2$, and sealing the injection well so as to establish a sealed well; (c) pressurizing the sealed well by permitting the liquid $CO_2$ and solid $CO_2$ inside the sealed well to form supercritical $CO_2$, thereby forming a pressurized well; and (d) depressurizing the pressurized well to reach a steady state reduced pressure, whereby an associated adiabatic expansion of the $CO_2$ cools the subsurface shale formation and causes thermal and mechanical stresses within the formation which in turn lead to fracturing of said formation. In some such embodiments, the steps of pressurizing and de-pressurizing are repeated until an equilibrium pressure is reached.

In some embodiments, the present invention is directed to methods of chemically modifying the kerogen within oil shale so as to render it mobile and subsequently extractable. Such chemical modification generally involves breaking of chemical bonds within the kerogen (i.e., cracking) and/or between the kerogen and the inorganic shale component. Such chemical modification can also involve a delamination of the kerogen from the inorganic shale component. The ability to chemically modify the kerogen in this manner is largely predicated on the ability to increase the kerogen's accessibility to a fluid that can effect such a chemical modification.

In some embodiments, the present invention is directed to methods comprising the steps of: (a) analyzing a subsurface kerogen-bearing shale formation so as to derive information regarding the kerogen contained therein; (b) increasing accessibility of said kerogen in the subsurface shale to a fluid, wherein the subsurface shale comprises an inorganic component in addition to the kerogen; (c) monitoring the increased accessibility provided in step (b); (d) contacting the kerogen in the subsurface shale with a reactive fluid to create a mobile kerogen-based product, wherein said reactive fluid is selected in view of the information derived in step (a); and (e) transporting the mobile kerogen-based product out of the subsurface shale formation to yield an extracted kerogen-based product. Optionally, such methods can further comprise a step of processing the extracted kerogen-based product.

In some embodiments, the present invention is directed to systems comprising: (a) a means for analyzing a subsurface kerogen-bearing shale formation so as to derive information regarding the kerogen contained therein; (b) a means for increasing accessibility of said kerogen in the subsurface shale to a fluid, wherein the subsurface shale comprises an inorganic component in addition to the kerogen; (c) a means for monitoring the increased accessibility provided by means (b); (d) a means of contacting the kerogen in the subsurface shale with a reactive fluid to create a mobile kerogen-based product, wherein said reactive fluid is selected in view of the information derived by means (a); and (e) a means for transporting the mobile kerogen-based product out of the subsurface shale formation to yield an extracted kerogen-based product. Optionally, such a system can further comprise a means for processing the extracted kerogen-based product.

Providing extension to other types of oil- and/or gas-bearing formations, in some embodiments, the present invention is directed to methods for extracting a hydrocarbon-based product from a low-permeability hydrocarbon-bearing subsurface formation, the methods comprising the steps of: (a) increasing permeability in a region of the subsurface formation to a fluid so as to establish a region of enhanced permeability; (b) contacting hydrocarbonaceous material in the region of enhanced permeability with a reactive fluid to create a mobile hydrocarbon-based product; and (c) transporting the mobile hydrocarbon-based product out of the subsurface formation to yield an extracted hydrocarbon-based product. In some such embodiments, the step of increasing permeability comprises the sub-steps of: (aa) drilling a cased injection well into the subsurface formation; (ab) pressurizing the injection well with a dense phase fluid to provide a pressurized well; and (ac) rapidly de-pressurizing the pressurized well to reach a steady state reduced pressure. In some such latter embodiments, the sub-steps of pressurizing and de-pressurizing are repeated until an equilibrium pressure is reached.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

1. Introduction

Figure 1:
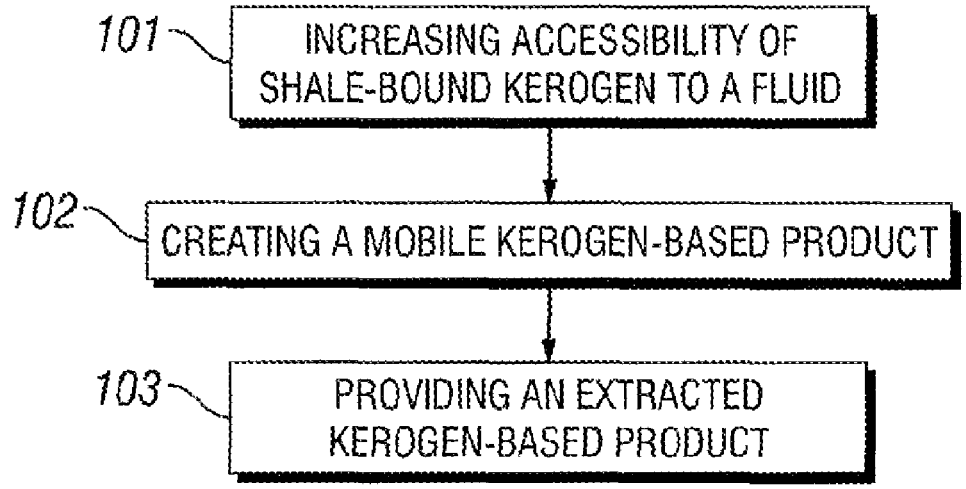
FIG. 1 depicts, in stepwise fashion, a general method of chemically modifying subsurface shale-bound kerogen so as to render it mobile and therefore extractable.

The present invention is directed to methods of extracting a kerogen-based product from subsurface (oil) shale formations, wherein such methods rely on fracturing and/or rubblizing portions of said formations so as to enhance their fluid permeability, and wherein such methods further rely on chemically modifying the shale-bound kerogen so as to render it mobile. The present invention is also directed to systems for implementing some such methods.

2. Definitions

"Shale," as defined herein, generally refers to "oil shale" and is a general term applied to a group of rocks rich enough in organic material (called kerogen) to yield petroleum upon pyrolysis and distillation. Such shale is generally subsurface and comprises an inorganic (usually carbonate) component in addition to the kerogen component.

"Kerogen," as defined herein and as mentioned above, is an organic component of shale. On a molecular level, kerogen comprises very high molecular weight molecules that are generally insoluble by virtue of their high molecular weight and likely bonding to the inorganic component of the shale. The portion of kerogen that is soluble is known as "bitumen;" bitumen typically being the heaviest component of crude oil. In fact, in a geologic sense, kerogen is a precursor to crude oil. Kerogen is typically identified as being one of five types: Type I, Type II, Type II-sulfur, Type III, or Type IV, based on its C:H:O ratio and sulfur content, the various types generally being derived from different sources of ancient biological matter.

"Kerogen-based," is a term used herein to denote a molecular product or intermediate derived from kerogen, such derivation requiring a chemical modification of the kerogen, and the term being exclusive of derivations carried out over geologic timescales.

A "subsurface shale formation," as defined herein, is an underground geological formation comprising (oil) shale.

A "low-permeability hydrocarbon-bearing formation," as defined herein, refers to formations having a permeability of less than about 10 millidarcies, wherein said formations comprise hydrocarbonaceous material. Examples of such formations include, but are not limited to, diatomite, coal, tight shales, tight sandstones, tight carbonates, and the like.

A "dense phase fluid," as defined herein, is a non-gaseous fluid. Such dense phase fluids include liquids and supercritical fluids (SCFs).

A "supercritical fluid," as defined herein and as mentioned above, is any substance at a temperature and pressure above its thermodynamic critical point. Supercritical fluids can be regarded as "hybrid solvents" with properties between those of gases and liquids, i.e., a solvent with a low viscosity, high diffusion rates and no surface tension. The most common supercritical fluids are supercritical carbon dioxide ($CO_2$) and supercritical water.

The term "mechanical stress," as used herein, refers to structural stresses within the shale formation that result from pressure variations within the formation. Such stress can lead to fracturing and/or rubblization of the shale formation.

The term "thermal stress," as used herein, refers to structural stresses within the shale formation that result from thermal variations. Such thermal stresses can induce internal mechanical stresses as a result of differences in thermal coefficients of expansion among the various components of the shale formation. Like mechanical stress mentioned above, thermal stress can also lead to fracturing and/or rubblization of the shale formation.

The term "fracturing," as used herein, refers to the structural degradation of a subsurface shale formation as a result of applied thermal and/or mechanical stress. Such structural degradation generally enhances the permeability of the shale to fluids and increases the accessibility of the kerogen component to such fluids. The term "rubblization," as used herein, is a more extensive fracturing process yielding fracture planes in multiple directions that generate shale-derived "rubble."

The term "cracking," as mentioned in the background section and as used herein, refers to the breaking of carbon-carbon bonds in the kerogen so as to yield species of lower molecular weight. "Retorting," provides thermal cracking of the kerogen. "Upgrading," provides cracking of the kerogen, but can involve a thermal or chemical upgrading agent. Accordingly, the term "thermal upgrading" is synonymous with the term "retorting."

The term "in situ," as used herein with regard to cracking or upgrading of kerogen, refers to such cracking or upgrading being carried out in the kerogen's native environment. In contrast to the in situ Shell method described in the background section, methods of the present invention are not truly done in situ because some fracturing of the shale formation must be done first, thereby altering the kerogen's environment from its native state.

The term "commercial petroleum-based products," as used herein, refers to commercial products that include, but are not limited to, gasoline, aviation fuel, diesel, lubricants, petrochemicals, and the like. Such products could also include common chemical intermediates and/or blending feedstocks.

3. Method Overview

Referring to FIG. 1, in some embodiments, the present invention is generally directed to methods for extracting a kerogen-based product from a subsurface shale formation comprising subsurface shale, the methods comprising the steps of: (Step 101) increasing accessibility of kerogen in subsurface shale to a fluid (e.g., increasing the permeability of the shale), wherein the subsurface shale comprises an inorganic component in addition to the kerogen; (Step 102) contacting the kerogen in the subsurface shale with an extraction fluid (or fluids) to create a mobile kerogen-based product; and (Step 103) transporting the mobile kerogen-based product out of the subsurface shale formation to yield an extracted kerogen-based product.

The above-mentioned step of increasing the accessibility of the subsurface shale to a fluid (Step 101) may include a variety of techniques and/or technologies such as, but not limited to, explosives, hydraulic fracturing, propellants, and the like. Generally, any method of fracturing and/or rubblizing regions of the shale formation, so as to render said shale more permeable to fluids, is suitable. Such fracturing and/or rubblizing can also involve chemicals reactive to, e.g., at least part of the inorganic shale component.

The step of contacting the kerogen with an extraction fluid (Step 102) generally involves an in situ chemical modification of the kerogen (e.g., cracking) and/or surrounding shale so as to render the modified kerogen component mobile (vide infra). Such chemical modification generally involves the making and/or breaking of chemical bonds.

The step of transporting the mobile kerogen-based product out of the subsurface shale formation (Step 103) is not particularly limited, but can generally be described as a means of flowing the mobile kerogen-based product out of the subsurface formation, where such a means can be active (e.g., pumping) and/or passive.

In some embodiments, the above-described method may involve one or more additional steps which serve to sample and subsequently analyze the shale prior to performing Step 101. Such sampling and analysis can have a direct bearing on the techniques employed in the subsequent steps.

In some embodiments, analysis and/or monitoring of the fracturing and/or rubblizing of the subsurface shale formation can be carried out during or after Step 101. Such analysis and/or monitoring can be performed using techniques known in the art for accomplishing such tasks.

In some embodiments, the extracted kerogen-based product is upgraded (thermally and/or chemically) at the surface. Such surface upgrading can be intermediate to subsequent refining.

4. Increasing Fluid Accessibility to the Kerogen

Figure 2:
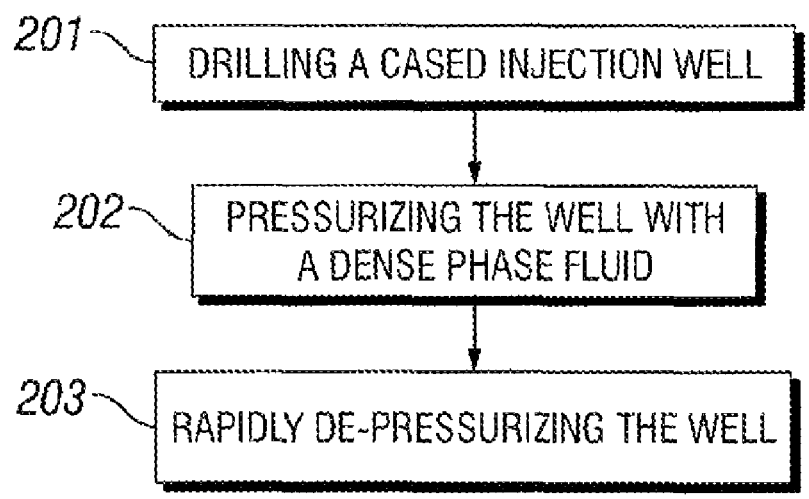
FIG. 2 depicts, in stepwise fashion, a method of increasing fluid accessibility to the kerogen, in accordance with some embodiments of the present invention.

Simultaneously referring to the above-described method and FIG. 2, in some embodiments, the step of increasing accessibility (Step 101) comprises the sub-steps of: (Sub-step 201) drilling a cased injection well into the subsurface shale formation comprising the subsurface shale; (Sub-step 202) pressurizing and subsequently sealing the injection well with a dense phase fluid to provide a pressurized well; and (Sub-step 203) rapidly de-pressurizing the pressurized well to reach a steady state reduced pressure. In some such embodiments, the sub-steps of pressurizing and de-pressurizing are repeated until an equilibrium pressure is reached.

The dense phase fluid can be any such fluid that suitably provides for increased accessibility of the kerogen to a fluid—typically due to fracturing and/or rubblizing of the shale in which the kerogen resides. In some embodiments, the dense phase fluid comprises a component selected from the group consisting of carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons (including, but not limited to, ethane, propane, butane, and combinations thereof), and the like.

In some embodiments, the pressure in the pressurized well exceeds the fracture pressure of the subsurface shale formation. Such formation fracture pressure could be ascertained beforehand, for example—thereby helping to direct the choice of variable parameters used in this step.

In some embodiments, the dense phase fluid is absorbed by the kerogen and the kerogen subsequently swells, and wherein the swollen kerogen expands the subsurface shale formation and creates mechanical stresses leading to subsequent fracturing and/or rubblization of said formation. In some such embodiments, the mechanical stresses created during the pressurizing and depressurizing sub-steps enhance fracturing and/or rubblization of the subsurface shale formation.

In some embodiments, the pressurizing and depressurizing sub-steps create thermal and/or mechanical stresses in the subsurface shale formation. In some such embodiments, the kerogen at least partially delaminates from the inorganic component of the shale as a result of the thermal stresses.

In some embodiments, explosives are added to the dense phase fluid to enhance rubblization and fracturing of the formation. Examples of such explosives include, but are not limited to, strongly oxidizing species, nitro-containing species (e.g., trinitrotoluene, nitroglycerine), thermite mixtures, and the like. The dense phase fluids to which such explosives can be added include, but are not limited to, carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons (including, but not limited to, ethane, propane, butane, and combinations thereof), and the like.

5. Creating a Mobile Kerogen-Based Product

In some embodiments, the step of contacting the kerogen in the subsurface shale with a reactive fluid to create a mobile kerogen-based product involves a chemical modification of the kerogen. In some such embodiments, the chemical modification involves at least some cracking of the kerogen, generating smaller kerogen-derived molecules that are correspondingly more mobile.

In general, the reactive fluid is any fluid (including mixtures) that can, either by itself or with an agent dissolved therein, chemically modify the kerogen so as to render it mobile and therefore extractable. In some embodiments, the reactive fluid comprises a reactive component selected from the group consisting of organic acids (e.g., formic acid), inorganic acids (e.g., hydrochloric), peroxides (e.g., $H_2O_2$), free radical producing chemicals (e.g., $F_2$), Lewis acids (e.g., $AlCl_3$), humic depolymerization agents (e.g., amines), olefin metathesis catalysts (e.g., W), reactive gases (e.g., $Cl_2$), enzymes (e.g., lipase), microbes (e.g., pseudomas), plasmas (e.g., He), catalysts (e.g., pyrite, in situ transition metals), and combinations thereof. Typically, such reactive components are dispersed, dissolved, or otherwise incorporated into a dense phase fluid. As above, suitable such dense phase fluids include, but are not limited to, carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons (including, but not limited to, ethane, propane, butane, and combinations thereof), and the like.

In some embodiments, depending on the conditions and reactive fluids employed and on the kerogen bonds that are broken, it is possible to generate a mobile kerogen-based product that is tailored so as to minimize recovery of heavy metals and/or other undesirable materials, or to increase recovery by reducing char and/or other carbon residues. Accordingly, it is possible to generate a mobile kerogen-based product that requires little or no additional refining.

6. Producing the Mobile Kerogen-Based Product

In some embodiments, the mobile kerogen-based product is extracted from the subsurface formation using an extraction fluid. Suitable extraction fluids, like the dense phase fluids, include, but are not limited to, carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons (including, but not limited to, ethane, propane, butane, and combinations thereof), and the like. In some embodiments, the extraction fluid is substantially indistinguishable from the reactive fluid (see above).

In some embodiments, it is contemplated that the mobile kerogen-based product comprises a slurry of kerogen particulates in the extraction fluid. Accordingly, such mobile kerogen-based product need not be dissolved in such a fluid.

In some embodiments, pumping is used to transport the mobile kerogen-based product out of the subsurface shale formation, wherein such pumping can be performed using techniques known to those of skill in the art. Conventional oil field practices (both flowing gas and pumping fluids, e.g., rod pumps, electrical submersible pumps, progressive cavity pumps, etc.) can be modified to provide reliability in a given producing environment. For example, modifications may require changes in metallurgy, pressure limitations, elastomeric compositions, temperature rating, and the like.

Production could use any standard producing process such as, but not limited to, Huff-n-Puff (i.e., a single well is used as both the producer and injector), water flooding, steam flooding, polymer flooding, solvent extraction flooding, thermal processes, diluent addition, steam assisted gravity drainage (SAGD), and the like.

7. Upgrading the Extracted Kerogen-Based Product

In some embodiments, the extracted kerogen-based product is upgraded to yield one or more commercial petroleum-based products. Various surface techniques common in the industry (e.g., catalytic cracking, hydroprocessing, thermal cracking, denitrofication, desulfurization) may be employed to obtain a desired commercial product from the extracted kerogen-based product. Such surface upgrading is largely dependent on the nature of the extracted kerogen-based product relative to the commercial product that is desired.

8. Integrated Production Method

Figure 3:
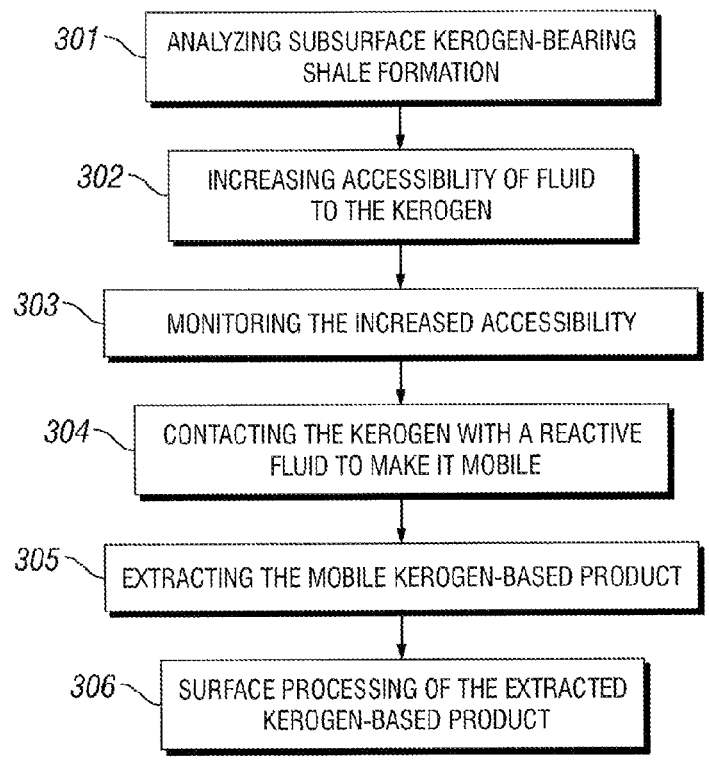
FIG. 3 depicts, in stepwise fashion, integrated processing methods of extracting a petroleum-based product from subsurface oil shale, in accordance with some embodiments of the present invention.

Referring to FIG. 3, in some embodiments, the present invention is directed to integrated production methods comprising the steps of: (Step 301) analyzing a subsurface kerogen-bearing shale formation so as to derive information regarding the kerogen contained therein; (Step 302) increasing accessibility of said kerogen in the subsurface shale to a fluid, wherein the subsurface shale comprises an inorganic component in addition to the kerogen; (Step 303) monitoring the increased accessibility provided in Step 302; (Step 304) contacting the kerogen in the subsurface shale with a reactive fluid to create a mobile kerogen-based product, wherein said reactive fluid is selected in view of the information derived in Step 301; (Step 305) transporting the mobile kerogen-based product out of the subsurface shale formation to yield an extracted kerogen-based product; and (Step 306) optionally processing the extracted kerogen-based product.

Generally, such above-described integrated production methods are consistent (in terms of their common steps) with the aforementioned methods of extracting a kerogen-based product from a subsurface shale formation. See above for more detail on the various steps shared by such methods.

9. Integrated Production System

Figure 4:
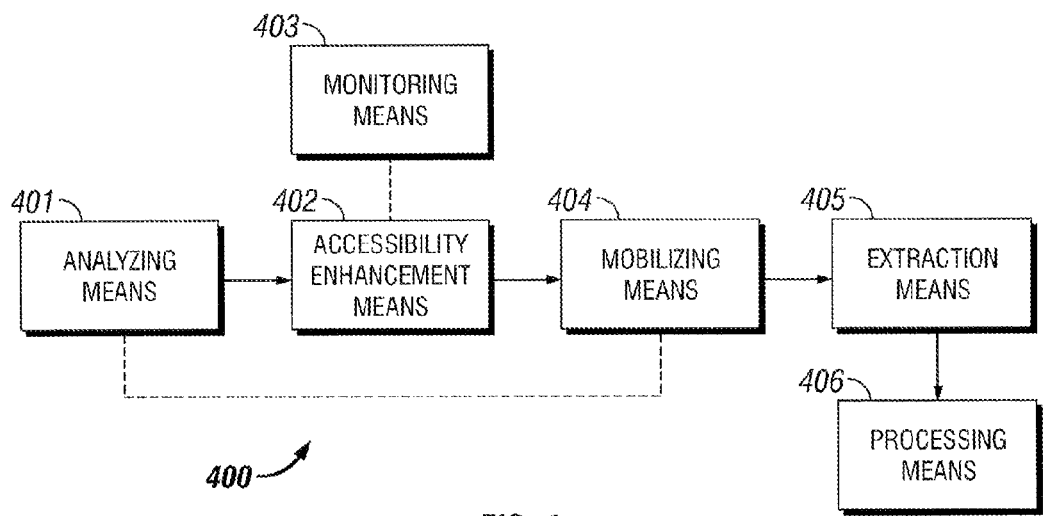
FIG. 4 is a flow diagram illustrating a system for implementing some integrated processing method embodiments of the present invention.

Referring to FIG. 4, in some embodiments, the present invention is directed to integrated production systems comprising: (Means 401) a means for analyzing a subsurface kerogen-bearing shale formation so as to derive information regarding the kerogen contained therein; (Means 402) a means for increasing accessibility of said kerogen in the subsurface shale to a fluid, wherein the subsurface shale comprises an inorganic component in addition to the kerogen; (Means 403) a means for monitoring the increased accessibility provided by Means 402; (Means 404) a means (mobilizing means) of contacting the kerogen in the subsurface shale with a reactive fluid to create a mobile kerogen-based product, wherein said reactive fluid is selected in view of the information derived by Means 401; (Means 405) a means (extraction means) for transporting the mobile kerogen-based product out of the subsurface shale formation to yield an extracted kerogen-based product; and (Means 406) a means for optionally processing the extracted kerogen-based product.

Like the integrated process methods, such above-described system embodiments are generally consistent with the aforementioned methods of extracting a kerogen-based product from a subsurface shale formation. Notwithstanding such general consistencies, exemplary such means are provided below.

Still referring to FIG. 4, Means 401 can include subsurface analyzing technologies such as, but not limited to, well logging, core sampling and analysis (incl. kerogen chemical analysis), and the like. Means 402 can include a means or subsystem for increasing fluid accessibility to the kerogen, wherein such a subsystem implements the sub-steps outlined in FIG. 2. Means 403 can include subsurface monitoring technologies such as, but not limited to, tilt-meters, microseismic techniques (involving geophones), and the like. See, e.g., Phillips. W. S., et al., "Reservoir mapping using microearthquakes: Austin Chalk, Giddings field, TX and 76 field. Clinton Co., Ky.," SPE 36651, Annual Technical Conference and Exhibition, Denver, Colo., Oct. 6-9, 1996. Means 404 typically comprises a subsystem for pumping a dense phase fluid into a fractured subsurface shale resource, wherein the fluid may further comprise agents operable for chemically modifying the kerogen so as to render it mobile. Means 405 typically comprises a subsystem for extracting a mobile kerogen-based product from the subsurface, wherein such a subsystem may comprise an extraction fluid (see above) and a pumping technology. Finally, Means 406 can involve any processing sub-system which optionally processes the extracted kerogen-based product to yield a desired product or intermediate. Exemplary such Means 406 include, but are not limited to, conventional retorting, pipeline transport, conventional separation techniques, and the like.

10. Variations

A variation (i.e., alternate embodiment) on the above-described process is the application of some or part of such above-described methods to alternative sources, i.e., low-permeability hydrocarbon-bearing (e.g., oil and gas) formations, in situ coal, in situ heavy oil, in situ oil sands, and the like. General applicability of at least some of the above-described invention embodiments to any hydrocarbon-bearing formation exists. Surface processing applications may include upgrading of oil shale, coal, heavy oil, oil sands, and other conventional oils with asphaltenes, sulfur, nitrogen, etc.

11. Examples

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example 1

This Example serves to illustrate how shale in a subsurface formation can be sampled and analyzed prior to fracturing and/or rubblizing, in accordance with some embodiments of the present invention.

Whole or conventional cores can be obtained using standard core sampling techniques known in the art and using bits such as Baker Hughes INTEQ coring bits. Sidewall and sidewall rotary cores can also be obtained, but these are typically smaller and generally of lower quality. Once obtained, the core samples can be subjected to a variety of analyses including, but not limited to, core gamma analysis, density, circumferential imaging and computed tomography (CT) scanning, fracture analysis, permeability, porosity, hydrocarbon recovery when exposed to the reactive fluid, electrical measurements, thermal conductivity measurements, rock mechanics, X-ray diffraction (XRD), nuclear magnetic resonance (NMR), total organic carbon (TOC), fluorescence and/or infrared spectroscopy, etc.

Information obtained from such core analysis can serve as a guide in selecting the appropriate reagents (e.g., fluids) and conditions used in implementing the methods and systems of the present invention.

In addition to, or instead of, water sampling (vide infra), well-logging can also be carried out to compliment the information obtained via core sampling. Such techniques can yield information about how the formation varies with depth.

Example 2

Figure 5:
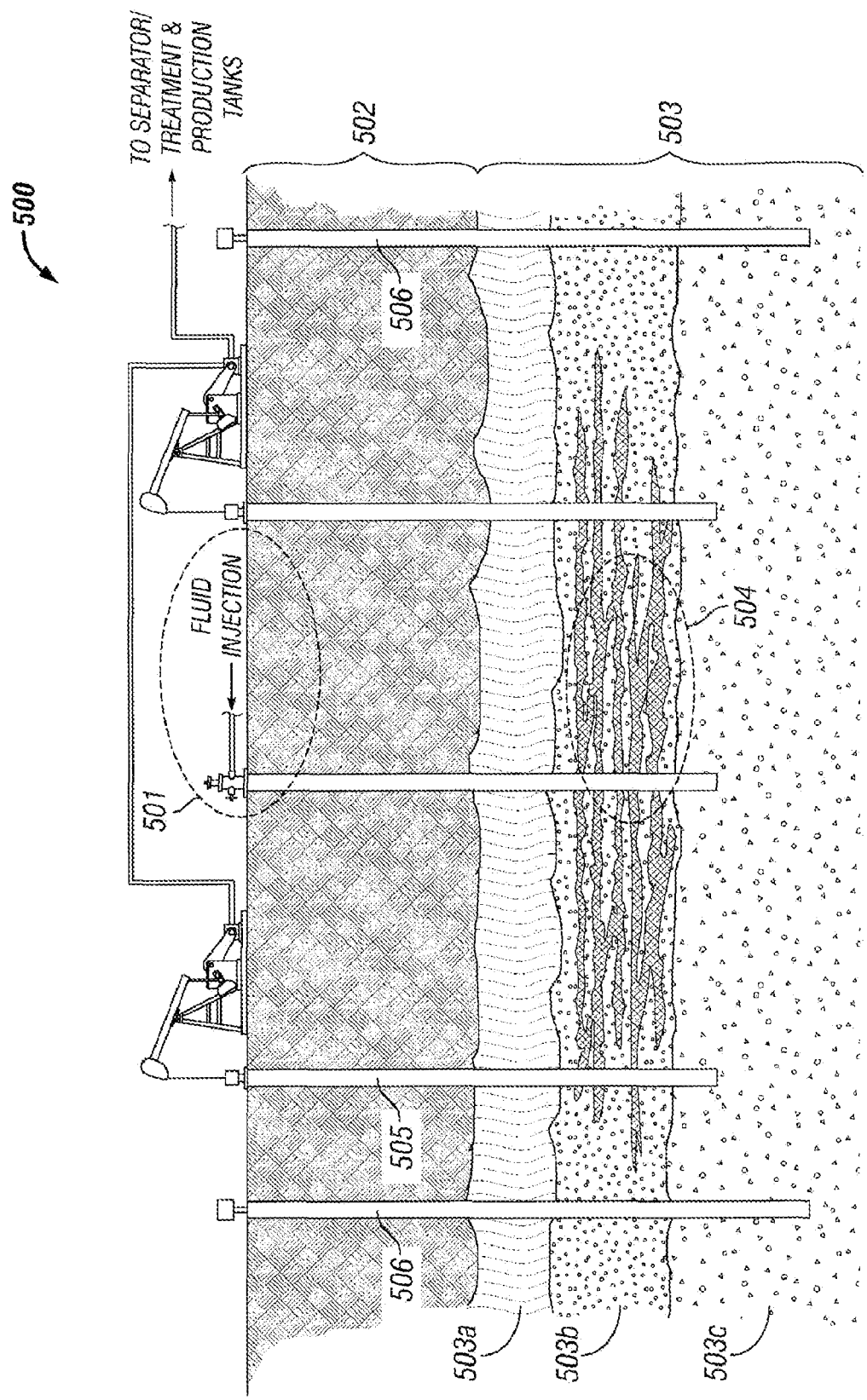
FIG. 5 is a schematic showing how a subsurface shale formation can be fractured, in accordance with some system and/or method embodiments of the present invention.

This Example serves to illustrate fracturing and/or rubblizing of shale in a subsurface shale formation so as to increase fluid accessibility to the kerogen contained therein, in accordance with some embodiments of the present invention, and particularly within the context of the exemplary system embodiment depicted in FIG. 5.

Referring to FIG. 5, integrated system 500 comprises establishing an injection well 501 that extends into the subsurface through the (e.g., Uinta) formation 502 and the (e.g., Green River) formation 503, wherein the latter is subdivided into three zones (503a, 503b, and 503c). Fluids are injected into the formation via injection well 501 and provide a fractured formation 503b having increased fluid accessibility to the kerogen contained therein. Such fluid access further provides for contacting the kerogen with a reactive fluid and extraction fluid so as to extract the mobile kerogen-based product out of the formation via one or more producing wells 505 to yield an extracted kerogen-based product. Note that water monitoring can be carried out, for example, via groundwater monitoring wells 506 to verify that no groundwater contamination has occurred as a result of fracturing into existing aquifers. One extracted, the extracted kerogen-based product can be transported via pipe to separator/treatment and production tanks.

Example 3

This Example serves to illustrate how the fracturing and/or rubblizing of shale in a subsurface shale formation can be monitored, in accordance with some embodiments of the present invention.

In lieu of, or in addition to, the groundwater monitoring well(s) described in Example 2, tiltmeters can be installed in a patterned arrangement on the surface of the shale formation. The tiltmeter installations would be in 8.5 inch holes, 25 feet deep, and lined with PVC pipe and perhaps a little cement on the bottom. They would be capped and have a solar panel for data collection. Geophones can also be installed either at the surface or sub-surface to gather micro-seismic information to help track fracture growth.

Example 4

This Example serves to illustrate the process of contacting the shale-bound kerogen with a reactive fluid, and how the kerogen can be chemically modified in situ, in accordance with some embodiments of the present invention.

Such an exemplary process would involve the injection of a dense phase fluid such as carbon dioxide in a liquid phase and a reactive co-solvent such as formic acid in a concentration that would allow for a single phase system at the formation temperature and pressure. Optimal performance would be achieved with pressure and temperatures above the critical point of the dense phase fluid, i.e., 1070 pisg and 31° C. for $CO_2$. The supercritical fluid (SCF) will have optimal penetration into the low permeable formation due to the supercritical fluids low diffusivity and undefined (zero) surface tension. The SCF will solubilize the co-solvent/additive (e.g., formic acid) to allow contact with both the inorganic and organic component of the oil shale. This contact will allow for a chemical reaction to occur with the organic and carbonate inorganic material in the oil shale to convert the materials to gas and/or small molecular size creating increased surface area and smaller molecular weight kerogen.

Example 5

This Example serves to illustrate how the mobile kerogen-based product can be extracted from the subsurface formation, in accordance with some embodiments of the present invention.

Once the kerogen is converted to a mobile kerogen-based product, an extraction fluid can be used to transport it to the surface. Typically, the extraction fluid is substantially similar in composition to that of the reactive fluid, albeit typically somewhat depleted in the reactive agent. Referring again to FIG. 5, and utilizing an extraction fluid resembling the reactive fluid described in Example 4, said extraction fluid is pumped into the formation via injection well(s) 501, contacts the mobile kerogen-based product in the fractured formation 504, and is pumped to the surface via production well(s) 505, transporting the mobile kerogen-based product along with it, thereby providing for an extracted kerogen-based product.

Example 6

This Example serves to illustrate post-extraction processes that can be performed on the extracted kerogen-based product, in accordance with some embodiments of the present invention.

If the extracted kerogen-based product comprises a substantial portion of high molecular weight species that render the product highly viscous, surface upgrading can be used to thermally-crack or "visbreak" the product to yield a lower-viscosity, more-easily-transportable product. Doing this within the immediate proximity of the extraction site can make good economic sense in that the lower viscosity product could then be more easily transported across long distances via pipeline.

12. Summary

The present invention is directed to methods for extracting a kerogen-based product from subsurface (oil) shale formations, wherein such methods rely on fracturing and/or rubblizing portions of said formations so as to enhance their fluid permeability, and wherein such methods further rely on chemically modifying the shale-bound kerogen so as to render it mobile. The present invention is also directed at systems for implementing such methods. The present invention is also directed to methods of fracturing and/or rubblizing subsurface shale formations and to methods of chemically modifying kerogen in situ so as to render it mobile.

13. Conclusion

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice.

It is therefore to be understood that the invention may be practiced otherwise than as specifically described without actually departing from the spirit and scope of the present invention as defined by the appended claims.

What is claimed:

1. A method for extracting a kerogen-based product from a subsurface shale formation comprising subsurface shale, wherein the subsurface shale comprises an inorganic component in addition to the kerogen, the method comprising the steps of:
   a) increasing accessibility of kerogen in subsurface shale to a fluid by (i) drilling a cased injection well into the subsurface shale formation comprising the subsurface shale; (ii) pressurizing the injection well with a dense phase fluid to provide a pressurized well; and (iii) rapidly de-pressurizing the pressurized well to reach a steady state reduced pressure, wherein the kerogen absorbs a portion of the dense phase fluid;
   b) contacting the kerogen in the subsurface shale with a reactive fluid to create a mobile kerogen-based product; and
   c) transporting the mobile kerogen-based product out of the subsurface shale formation to yield an extracted kerogen-based product.

2. The method of claim 1, wherein the sub-steps of pressurizing and de-pressurizing are repeated.

3. The method of claim 1, wherein the dense phase fluid comprises a component selected from the group consisting of carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons, and combinations thereof.

4. The method of claim 1, wherein the pressure in the pressurized well exceeds the fracture pressure of the subsurface shale formation.

5. The method of claim 1, wherein the dense phase fluid is absorbed by the kerogen and the kerogen subsequently swells, and wherein the swollen kerogen expands the subsurface shale formation and creates mechanical stresses leading to subsequent fracturing and rubblization of said formation.

6. The method of claim 1, wherein the mechanical stresses created during the pressurizing and depressurizing sub-steps enhance fracturing of the subsurface shale formation.

7. The method of claim 1, wherein the pressurizing and depressurizing sub-steps create thermal stresses in the subsurface shale formation.

8. The method of claim 7, wherein kerogen at least partially delaminates from the inorganic component of the shale as a result of the thermal stresses.

9. The method of claim 1, wherein explosives are added to the dense phase fluid to enhance rubblization and fracturing of the formation.

10. The method of claim 1, wherein the step of contacting the kerogen in the subsurface shale with a reactive fluid to create a mobile kerogen-based product involves a chemical modification of the kerogen.

11. The method of claim 10, wherein the chemical modification involves at least some cracking of the kerogen.

12. The method of claim 1, wherein the reactive fluid comprises a first component selected from the group consisting of carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons, and combinations thereof; and a second component selected from the group consisting of organic acids, inorganic acids, peroxides, free radical producing chemicals, Lewis acids, humic depolymerization agents, olefin metathesis catalysts, reactive gases, enzymes, microbes, plasmas, catalysts, and combinations thereof.

13. The method of claim 1, wherein the step of transporting the mobile kerogen-based product out of the subsurface shale formation comprises using an extraction fluid.

14. The method of claim 13, wherein the extraction fluid is selected from the group consisting of carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons, and combinations thereof.

15. The method of claim 13, wherein the extraction fluid is substantially indistinguishable from the reactive fluid.

16. The method of claim 1, wherein pumping is used to transport the mobile kerogen-based product out of the subsurface shale formation.

17. The method of claim 1, wherein the extracted kerogen-based product is upgraded to yield one or more commercial petroleum-based products.

18. The method of claim 1, further comprising, after the step of pressurizing and before the step of depressurizing, an interim step of contacting the shale with a heated fluid to enhance the thermal stresses created in the subsurface shale formation.

19. A method for extracting a hydrocarbon-based product from a low-permeability hydrocarbon-bearing subsurface formation, the method comprising the steps of:
   a) increasing permeability in a region of the subsurface formation to a fluid so as to establish a region of enhanced permeability by (i) drilling a cased injection well into the subsurface shale formation comprising the subsurface shale; (ii) pressurizing the injection well with a dense phase fluid to provide a pressurized well; (iii) contacting the subsurface formation with a heated fluid to enhance thermal stresses created in the subsurface formation; and (iv) rapidly de-pressurizing the pressurized well to reach a steady state reduced pressure;
   b) contacting hydrocarbonaceous material in the region of enhanced permeability with a reactive fluid to create a mobile hydrocarbon-based product; and
   c) transporting the mobile hydrocarbon-based product out of the subsurface formation to yield an extracted hydrocarbon-based product.

20. The method of claim 19, wherein the sub-steps of pressurizing and de-pressurizing are repeated.

21. The method of claim 19, wherein the dense phase fluid comprises a component selected from the group consisting of carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons, and combinations thereof.

22. The method of claim 19, wherein the step of contacting the hydrocarbons in the subsurface formation with a reactive fluid to create a mobile hydrocarbon-based product involves a chemical modification of the hydrocarbon.

23. The method of claim 19, wherein the reactive fluid comprises a first component selected from the group consisting of carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons, and combinations thereof and a second component selected from the group consisting of organic acids, inorganic acids, peroxides, free radical producing chemicals, Lewis acids, humic depolymerization agents, olefin metathesis catalysts, reactive gases, enzymes, microbes, plasmas, catalysts, and combinations thereof.

24. The method of claim 19, wherein the step of transporting the mobile hydrocarbon-based product out of the subsurface formation comprises using an extraction fluid.

25. The method of claim 24, wherein the extraction fluid is selected from the group consisting of carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons, and combinations thereof.

26. The method of claim 24, wherein the extraction fluid is substantially indistinguishable from the reactive fluid.

27. A method for extracting a kerogen-based product from a subsurface shale formation comprising subsurface shale, wherein the subsurface shale comprises an inorganic component in addition to the kerogen, the method comprising the steps of:

a) increasing accessibility of kerogen in subsurface shale to a fluid by (i) drilling a cased injection well into the subsurface shale formation comprising the subsurface shale; (ii) pressurizing the injection well with a dense phase fluid to provide a pressurized well; (iii) contacting the shale with a heated fluid to enhance the thermal stresses created in the subsurface shale formation and (iv) rapidly de-pressurizing the pressurized well to reach a steady state reduced pressure, b) contacting the kerogen in the subsurface shale with a reactive fluid to create a mobile kerogen-based product; and c) transporting the mobile kerogen-based product out of the subsurface shale formation to yield an extracted kerogen-based product.

* * * * *